United States Patent [19]

Solaroli

[11] 4,258,850

[45] Mar. 31, 1981

[54] APPARATUS FOR SORTING WORKPIECES BELONGING TO DIFFERENT CLASSES

[75] Inventor: Sergio Solaroli, Bologna, Italy

[73] Assignee: Finike Italiana Marposs, S.p.A., S. Marino, Italy

[21] Appl. No.: 29,547

[22] Filed: Apr. 12, 1979

[30] Foreign Application Priority Data

Apr. 17, 1978 [IT] Italy ................................ 3394 A/78

[51] Int. Cl.$^3$ .................... B07C 9/00; B65G 11/10; B65G 47/46
[52] U.S. Cl. .................................... 209/655; 193/23; 193/25 R; 198/360; 209/924
[58] Field of Search ............... 209/655, 924; 198/359, 198/360, 361, 366, 370, 371, 750, 751; 193/23, 25 R, 25 A, 25 FT, 25 S, 25 C; 414/51, 53, 84, 88

[56] References Cited

U.S. PATENT DOCUMENTS

| 789,135 | 5/1905 | Baggaley | 198/360 X |
|---|---|---|---|
| 1,663,539 | 3/1928 | Bellinger | 209/655 X |
| 1,668,804 | 5/1928 | De Back | 193/23 |
| 1,810,512 | 6/1931 | Worst | 193/23 X |
| 1,861,335 | 5/1932 | Cain et al. | 198/361 X |
| 2,947,401 | 8/1960 | Schuricht et al. | 193/25 FT |

*Primary Examiner*—Robert J. Spar
*Assistant Examiner*—Edward M. Wacyra
*Attorney, Agent, or Firm*—Stevens, Davis, Miller & Mosher

[57] ABSTRACT

An apparatus for sorting workpieces belonging to different classification classes from a loading device, to a plurality of outputs for the different classification classes, comprising a quide chute to direct the workpieces towards the relevant outputs and control apparatus adapted to receive signals responsive to the class of each workpiece in order to actuate the guide chute, the guide chute including a support adapted to let the workpiece to be sorted while in transit from the loading device to the relevant output, the support including a first end communicating with the loading device and a second end mobile in order to be selectively placed in communication with one of the outputs, the control apparatus being adapted to position the second end in correspondence to the output related to the workpiece to be sorted.

12 Claims, 4 Drawing Figures

APPARATUS FOR SORTING WORKPIECES BELONGING TO DIFFERENT CLASSES

The present invention relates to an apparatus for sorting workpieces belonging to different classification classes, with a loading device, a plurality of outputs for the different classification classes, guide means to direct the workpieces to the relevant outputs and control means adapted to receive signals responsive to the classes of the workpieces in order to actuate the guide means.

More particularly the apparatus relates to the sorting of automobile connectinng rods.

Apparatuses are already known which sort mechanical workpieces —previously checked and classified by gauging machines or other checking devices—and which direct the workpieces of the different classes to relevant outputs. The workpieces are guided by a plurality of switches or pawls, selectively actuated depending on the classification classes previously detected, which direct the workpiece towards a relevant output. The outputs are placed in series, one after the other.

The known apparatuses are rather complex and cumbersome from a mechanical and electrical point of view and present some drawbacks insofar as the operation speed, the frequency of failures, and high cost are concerned.

The structure of the known apparatuses is such as to determine the possible simultaneous presence of various workpieces between the gauging machine and the various sorting outputs and from this derive considerable circuitry complexity, since it is necessary to memorize the signals responsive to the classification classes in order to activate in due time the relevant switches.

An object of the invention is to provide an apparatus for the sorting of workpieces that has an extremely fast functioning speed, that is simple from a structural point of view, that is extremely reliable in operation and that has a relatively low cost.

Other objects and advantages will become evident through the following description regarding an apparatus for sorting workpieces belonging to different classification classes, with a loading device, a plurality of outputs for the different classification classes, guide means to direct the workpieces towards the relevant outputs and control means adapted to receive signals responsive to the class of each workpiece in order to actuate the guide means. According to the invention, the guide means include a support adapted to let the workpiece to be sorted transit from the loading device to the relevant output, the support includes a first end communicating with the loading device and a second end mobile in order to be selectively placed in communication with one of the outputs and the control means are adapted to position the second mobile end in correspondence with the output related to the workpiece to be sorted.

The invention is now described in more detail according to a preferred embodiment, given by way of non-limiting example and illustrated in the accompanying drawings, in which.

Figure 1:
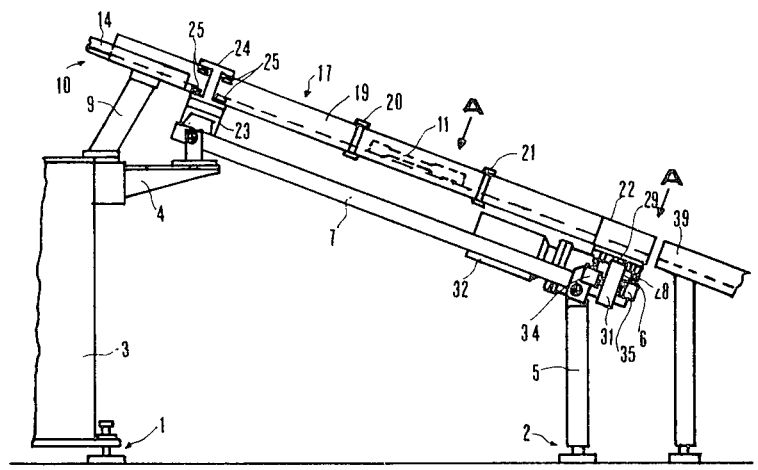
FIG. 1 is a lateral view of an apparatus of the present invention for sorting automobile connecting rods.

The frame of the apparatus shown in FIGS. 1 to 4 is supported by bases 1 and 2 and includes a column 3, which has a bracket 4, two stanchions, only one of which, 5, can be seen, a horizontal bar 6 coupled to stanchions 5 and two slanting bars 7 and 8, the ends of which are coupled to bracket 4 and to bar 6 respectively.

Bracket 4 also supports—by means of an arm 9—an input chute 10 which receives in succession connecting rods 11 to be sorted. Connecting rods 11 arrive directly from the output of a measuring machine, not shown, that classifies them according to their geometrical and weight characteristics.

The input chute 10 has a slanting base 12 for supporting and gravitationally sliding connecting rods 11 and two lateral walls 13 and 14.

Base 12 has at its end three longitudinal grooves 15 for seating and guiding the ends of three vertically faced flexible metal bands 16.

The upper edges of bands 16 form the support and gravitational sliding base of a flexible chute 17 also including two lateral metal bands 18 and 19 which form the lateral walls of chute 17.

Metal bands 18 and 19 end, in their upper section (FIG. 1) with a bent section the end of which can slide on the internal faces of walls 13 and 14.

The faces of bands 18 and 19 are vertically arranged, just like those of bands 16, and are higher than the bands 16.

Bands 16, 18 and 19 are clamped in two intermediate sections to two cross-members 20 and 21 basically having a U shape, while at the lower end the bands are clamped to a slide 22.

There is a support 23 fixed on bars 7 and 8 which supports a small frame 24 whereupon are mounted idle rollers that axially guide bands 16, 18 and 19. Four of these rollers can be seen in FIG. 1; they are all identified with the same reference number, 25.

Slide 22 can slide, by means of rollers 26 and 27 (FIG. 4), on a rail 28 of bar 6 and it is clamped to a toothed belt 29 supported by two toothed pulleys 30 and 31.

The driving pulley 30 can be made to rotate by a motor 32 mounted on a support 33 fixed to bar 6.

The idle transmission pulley 31 has its axle mounted at a side of two angular plates 34 and 35.

The other sides of plates 34 and 35 are supported by two small pistons 36 and 37 sliding in cylinders obtained in a block 38 supported by bar 6.

The cylinders house two springs, not shown, that push pistons 36 and 37 towards the outside.

Laterally to bar 6 and to belt 29 there are arranged, one beside the other, output chutes 39 for the different classification classes of connecting rods 11. Chutes 39, which allow the gravitational sliding of connecting rods 11, are schematically shown in FIG. 2 with arrows.

Figure 2:
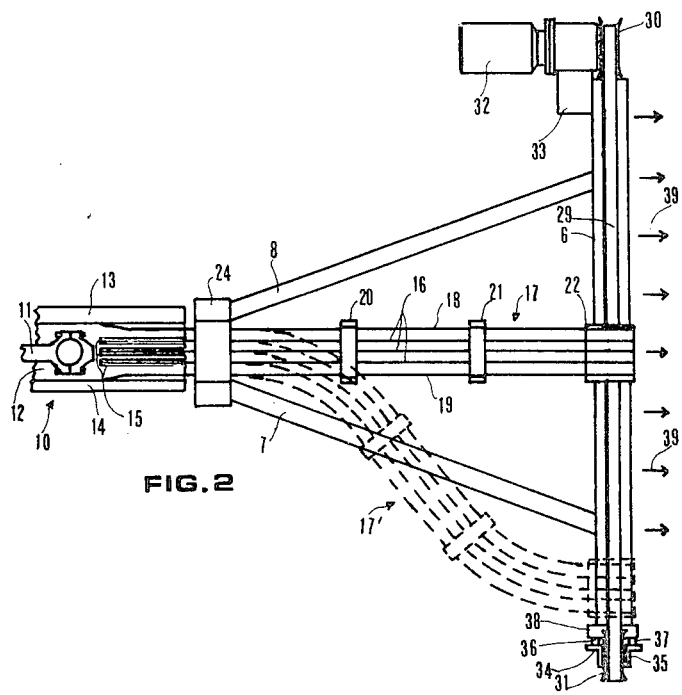
FIG. 2 is a view of the apparatus according to the direction indicated by arrows A—A in FIG. 1.
Figure 3:
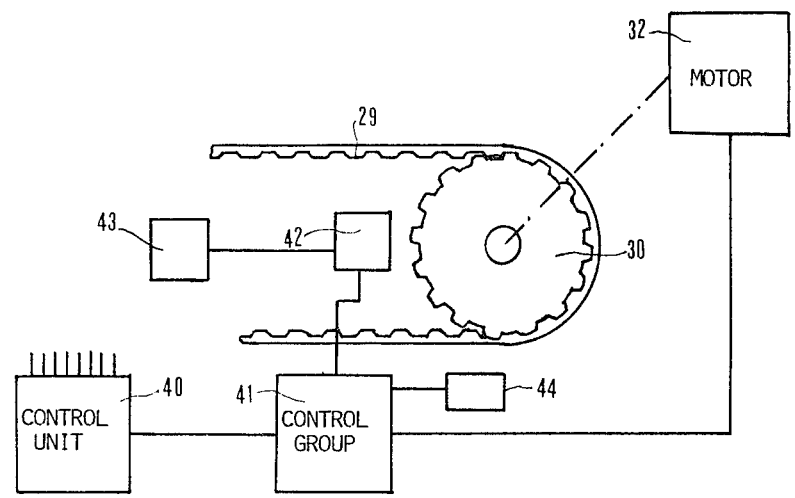
FIG. 3 is a diagram of the control devices of the apparatus shown in FIGS. 1 and 2, according to a preferred embodiment.

The operation of the apparatus shown in FIGS. 1 and 2 is now described with reference to the diagram shown in FIG. 3.

When the checking of a connecting rod 11, carried out by a gauging machine of a known type, ends, the machine controls the ejection of the connecting rod and sends a signal responsive to the classification class of the connecting rod to one of the inputs of a control unit 40 of the apparatus. In the apparatus shown in FIGS. 1 and 2 the outputs 39 are eight and consequently even the maximum number of classification classes and the number of inputs of unit 40 are the same.

The control unit 40 sends the signal received to a control group 41 of motor 32. The control group 41 receives from a sensing and coding unit 42 a signal responsive to the angular position of pulley 30, and consequently of belt 29 and of slide 22, with respect to a reference position.

The reference position can be defined, for example, by stroke limit microswitches 43, actuated by slide 22 and that supply signals for zero setting the sensing and coding unit 42.

The control group 41 suitably codes the signal received by unit 40, compares the signal thus coded with the signal of the sensing and coding unit 42 and controls, by means of a signal resulting from the comparison, the actuation of motor 32.

Motor 32 makes pulley 30 rotate in a suitable direction until slide 22, by moving in a direction parallel to the front line of output chutes 39, rapidly reaches a position adjacent to chute 39 corresponding to the class of connecting rod 11 that is arriving. This positioning of the slide is sufficiently rapid to be completed before connecting rod 11, by sliding on the surface of chutes 10 and 17, reaches slide 22. Therefore when the connecting rod 11 arrives, it can continue its travel along the appropriate output chute 39, the axis of which coincides with the sliding direction of the connecting rod on slide 22. Of course this direction is perpendicular to the shifting direction of slide 22.

The ejection of connecting rod 11 is signalled by a microswitch 44 which provides control group 41 with an enabling signal for the positioning of slide 22 in the position corresponding to the class of the following arriving connecting rod, this positioning being controlled by the relevant output signal of unit 40.

Microswitch 44 can be suitably located on slide 22, which in this case is equipped with a contact shoe with an electric power supply line (the shoe and electric line are not shown in the figures).

As an alternative, microswitch 44 can be one of the relevant microswitches arranged at output chutes 39 in order to be actuated when connecting rods 11 transit.

As it can be seen in FIG. 2, the length of chute 17 from frame 24 to slide 22 varies according to the position of the slide.

The length increases while slide 22 moves from its central position towards the lateral positions. In the central position, shown with continuous lines in FIG. 2, the longitudinal symmetrical line of chute 17 is a straight line coinciding with the axis of input chute 10. The shape 17' taken by chute 17 in one of the lateral end positions is shown in FIG. 2 with dashed lines.

The variation in length of the above specified section of chute 17 is allowed by grooves 15 which axially guide the ends of bands 16, while the lateral bands 18 and 19 slide on the internal faces of walls 13 and 14.

The width and the slope of chute 17 are designed in order to ensure that connecting rods 11 slide in a direction parallel to their axes even when the chute assumes its maximum bending position, as a consequence of the bending of bands 16, 18 and 19 in a transversal direction.

The width of chute 17 in the transversal sections does not basically vary as a consequence of its bending, thanks to cross-members 20 and 21 which, together with the seats for the bands 16, 18 and 19—obtained in slide 22 and in the input chute 10—and with rollers 25, maintain the bands at a substantially constant distance between one another.

Figure 4:
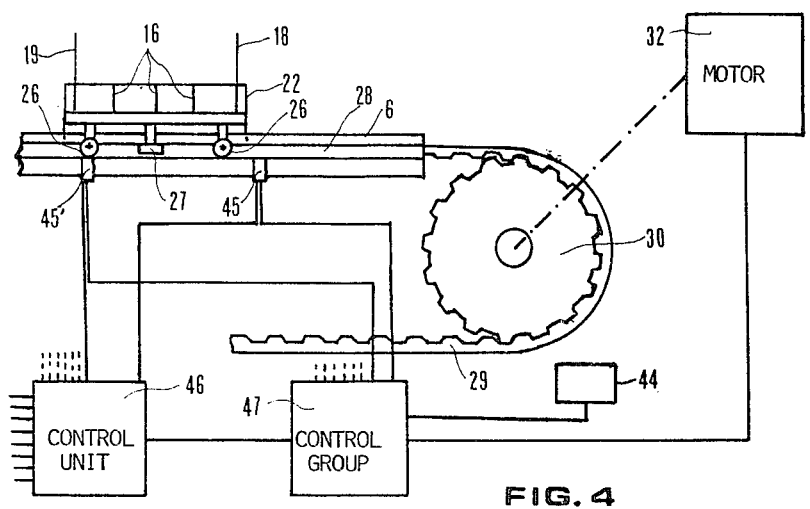
FIG. 4 shows some items of the apparatus shown in FIGS. 1 and 2 and a variant of the relevant control devices.

According to the variant of FIG. 4, the positioning of slide 22 is controlled by microswitches 45, 45', . . . Microswitches 45, 45' . . . each have a terminal connected to relevant outputs of a control unit 46. The control unit 46 has just as many inputs at which it receives signals indicating the classes of the connecting rods 11 to be sorted. Another terminal of each microswitch 45, 45', . . . is connected to a control group 47 of motor 32. The control group 47 is connected to the microswitch or microswitches 44 and it also receives from the control unit 46 an actuation signal commanding the rotation of motor 32 in a suitable direction. The signal for stopping motor 32 is provided by one of microswitches 45, 45', . . . when it is tripped by slide 22, and more precisely by the microswitch corresponding to the required sorting chute. In fact, just this microswitch receives from unit 46 voltage at a terminal.

The sliding pistons 36 and 37, apart from maintaining belt 29 taut, allow the previously mentioned springs to take up the inertial forces due to accelerations and decelerations of slide 22, while preventing the forces from being entirely transmitted to belt 29.

Obviously the aforedescribed apparatus can undergo other variants and changes, equivalent from a functional and structural point of view, without falling outside the scope of the present invention.

What is claimed is:

1. An apparatus for sorting pieces belonging to different classification classes from a loading device to a plurality of outputs for the different classification classes, comprising:
    guide means to direct the pieces towards relevant outputs, including a guide, for gravitationally sliding the pieces, with a first end communicating with the loading device for receiving a piece to be sorted, an intermediate section and a second end, the second end being mobile perpendicularly to the sliding direction of the piece in correspondence with the same second end, in order to be selectively placed in communication with one of the outputs; and
    control means adapted to receive signals corresponding to the class of each piece in order to position the second end of the guide in correspondence to the output related to the piece to be sorted, the control means including a mobile belt, the second end of the guide being fixed to the mobile belt.

2. The apparatus according to claim 1, wherein said intermediate section of the guide is elastically flexible in a transversal direction.

3. The apparatus according to claim 2, wherein the control means include a motor, two pulleys supporting the belt, one of the pulleys being actuated by the motor, and circuit means for controlling the stopping of the pulley actuated by the motor and of the belt for positioning the second end of the sliding guide.

4. The apparatus according to claim 3, wherein the control means include switches that are actuated by the second end of the sliding guide.

5. The apparatus according to claim 4, wherein the pulleys and the belt are toothed.

6. The apparatus according to claim 3, wherein the pulleys and the belt are toothed.

7. The apparatus according to claim 3, wherein the control means include sensing means to detect the position of the belt and comparison means adapted to receive a signal indicating the required position of said second end and an output signal of the sensing means.

8. The apparatus according to claim 3, wherein the guide means include a support for supporting and sliding the second end of the sliding guide.

9. The apparatus according to claim 2, wherein the guide for gravitationally sliding the pieces includes parallel bands flexible in a transversal direction and stiffening cross-members for defining a sliding track for the pieces.

10. The apparatus according to claim 9, wherein the guide means include guide rollers for the sliding guide and longitudinal seats obtained in the loading device for allowing a longitudinal movement of the ends of the bands located in correspondence to the loading device.

11. The apparatus according to claim 1 or claim 2, wherein the control means include switch means adapted to indicate that a piece has been ejected and to control the positioning of said second mobile end in correspondence to the output corresponding to the class of the following piece to be sorted.

12. An apparatus for sorting pieces belonging to different classification classes, comprising:
- an input chute, for gravitationally sliding the pieces, the input chute extending in a longitudinal direction;
- a plurality of adjacent output chutes, corresponding to the different classification classes, for gravitationally sliding the pieces, the output chutes being parallel to the longitudinal direction;
- guide means for gravitationally directing the pieces towards the relevant output chutes, including a sliding guide with a first end in connection with the input chute and aligned with it, a second end movable in a direction perpendicular to the longitudinal direction in order to be selectively placed in communication with one of the output chutes, and an intermediate section, flexible in said direction perpendicular to the longitudinal direction, with a first portion mobile in the longitudinal direction with respect to the first end, and a second portion fixed to the second end;
- and control means to position the second end in correspondence to the output chute related to the class of the piece to be sorted, the control means including a mobile belt, the second end of the guide being fixed to the mobile belt.

* * * * *

UNITED STATES PATENT AND TRADEMARK OFFICE
CERTIFICATE OF CORRECTION

PATENT NO. : 4,258,850
DATED : March 31, 1981
INVENTOR(S) : Sergio SOLAROLI

It is certified that error appears in the above—identified patent and that said Letters Patent is hereby corrected as shown below:

On the title page,

Correct the name of the Assignee from "Finike Italiana Marposs S.p.A., S. Marino, Italy" to -- Finike Italiana Marposs, S.p.A. Bentivoglio S. Marino (Bo), Italy --.

In the Abstract, line 4, correct "quide" to -- guide --.

Signed and Sealed this

Eighth Day of February 1983

[SEAL]

Attest:

GERALD J. MOSSINGHOFF

Attesting Officer

Commissioner of Patents and Trademarks